United States Patent [19]

Bright

[11] 4,015,398

[45] Apr. 5, 1977

[54] CHANNEL-SHAPED SEALING, FINISHING AND GUIDING STRIPS

[76] Inventor: Robert G. Bright, Gerhart-Hauptmann-Strasse 5, 406 Viersen 1, Germany

[22] Filed: Sept. 10, 1975

[21] Appl. No.: 612,201

[52] U.S. Cl. .................................. 52/716; 52/208; 52/212; 52/408

[51] Int. Cl.² ...................... E04C 2/38; E08B 3/00

[58] Field of Search ............ 52/208, 212, 408, 400, 52/93, 403, 396, 716, 397, 398, 732, 475, 476; 49/490

[56] References Cited

UNITED STATES PATENTS

| | | | |
|---|---|---|---|
| 1,497,140 | 6/1924 | Green | 52/93 |
| 2,767,814 | 10/1956 | Johnson | 52/208 |
| 2,860,744 | 11/1958 | Mascari | 52/212 |
| 3,455,080 | 7/1969 | Meadows | 52/716 |
| 3,479,768 | 11/1969 | Smadja | 52/616 |
| 3,547,515 | 12/1970 | Shanok et al. | 52/716 |
| 3,685,231 | 8/1972 | Blose | 52/716 |
| 3,706,173 | 12/1972 | Taylor | 52/716 |
| 3,807,978 | 4/1974 | Niemanns | 52/716 |

FOREIGN PATENTS OR APPLICATIONS 487,742  11/1952  Canada .................................. 52/398

Primary Examiner—Price C. Faw, Jr.
Assistant Examiner—Robert C. Farber

[57] ABSTRACT

A channel shaped sealing strip is made of two L-shaped members which lock together to define a channel. Each member may be made of extruded flexible material such as plastics or rubber in which is embedded a metal core or carrier. Each member may define on one of its walls a gripping rib which, in the assembled channel, faces the corresponding rib on the other member and extends continuously along and within the channel to assist in holding the strip onto a mounting flange. The extruded material of the two members may be of respectively different hardnesses. The strip may be made up into a closed loop frame, the two members along one side of which may be pulled apart to facilitate mounting of the frame on to its mounting flange.

14 Claims, 4 Drawing Figures

CHANNEL-SHAPED SEALING, FINISHING AND GUIDING STRIPS

BACKGROUND OF THE INVENTION

The invention relates to flexible channel-shaped sealing, finishing and guide strips for use as draught excluding seals, beadings, window channels, flange finishers (for covering welded flanges), and the like, and to metal cores or carriers for such strips. Such strips are hereinafter referred to generically as "sealing strips," and are particularly, though not exclusively, for use in vehicle construction.

Such sealing strips are known which are extruded from material such as plastics material to form an integral channel, the extruded material being for example extruded over a channel shaped metal core or carrier. It is also known to provide such a channel with respective gripping ribs which run longitudinally along the inner, facing, surfaces of the channel to assist in mounting the strip on a mounting flange.

It is further known in such sealing strips to attach a soft sealing section (e.g., a soft rubber tube) to the outside of one wall of the channel, as by adhesive to provide a weather seal for a door.

An object of the invention is to provide an improved sealing strip.

A more specific object of the invention is to provide a channel shaped sealing strip whose gripping ribs have improved gripping and sealing properties.

Another more specific object of the invention is to provide a channel shaped sealing strip which can reduce the amount of plastics material used in the strip.

SUMMARY OF THE INVENTION

According to the invention, there is provided a sealing strip, comprising flexible material in channel form incorporating a metal core or carrier, and whose opposite walls which define the inner and outer sides of the channel carry, on and integral with their inner, facing surfaces, respective gripping ribs which extend along the said surfaces longitudinally of the channel and which are directed towards each other for assisting in retaining the sealing strip on a mounting flange, the ribs on the respective surfaces being of different hardnesses.

According to the invention, there is also provided a sealing strip, comprising two members extending longitudinally alongside each other and being separate from each other but so attached to each other and having such respective cross-sectional form they together define a channel. One of these members may be of plastics material and the other of rubber material and they may incorporate metal cores or carriers.

BRIEF DESCRIPTION OF THE DRAWINGS

Sealing strips embodying the invention and methods according to the invention of making sealing strips will now be described, by way of example only, with reference to the accompanying diagrammatic drawings in which.

DESCRIPTION OF PREFERRED EMBODIMENTS

Figure 1:
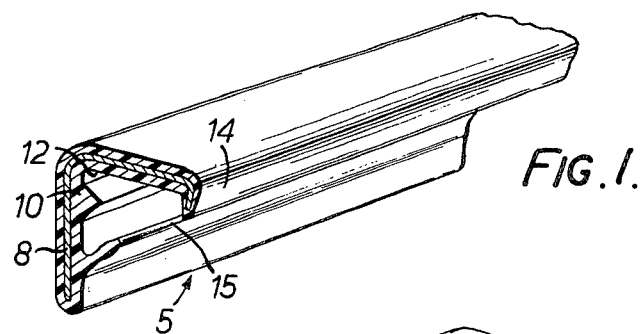
FIGS. 1 and 2 are perspective views of two members forming the sealing strip.
Figure 2:
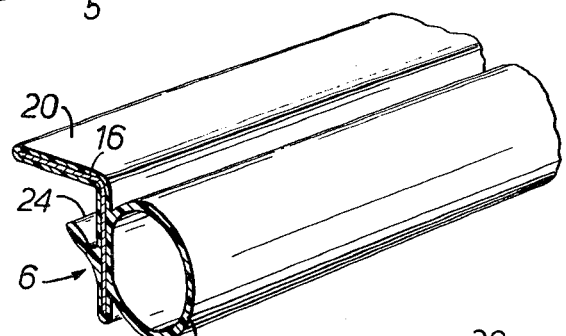

The sealing strip shown in FIGS. 1 and 2 comprises two separately formed longitudinal members 5 and 6 each of generally L-section. The member 5 comprises plastics material which is extruded over a longitudinally extending L-section metal core or carrier 8. The metal core or carrier 8 may comprise a series of entirely separate L-shaped elements. Instead, however, the core or carrier may comprise a series of L-shaped links joined by integral connecting portions. Other examples of metal cores or carriers which can be used are cores or carriers made from a corrugated integral unapertured thin metal blank which is bent into L-shape transversely of the corrugations, or a carrier made of bent wire.

The member 5 is formed with a longitudinally extending lip 10, this being formed during the extrusion process, which is spaced from the bent-over shorter limb of the member 5 to leave a longitudinally extending slot 12. In addition, the distal end of the limb of the member 5 is bent over to form a longitudinally extending lip 14 for a purpose to be described, while the longer limb of the member 5 carries a longitudinally extending rib 15.

Figure 3:
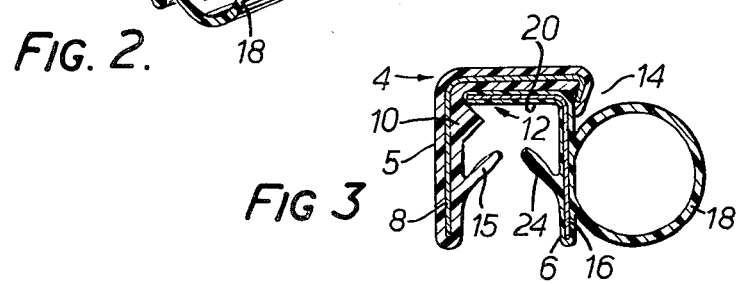
FIG. 3 is a cross-section through the assembled sealing strip.

The hardness of the material of the member 6 (FIG. 2) may be the same as or different from that of the member 5. The member 6 is preferably made of rubber material, is also of generally L-section, and may incorporate a metal core or carrier 16 which may be of the same form as the core or carrier 8. Advantageously, the member 6 also carries a longitudinally extending tubular section 18 of hollow form. The section 18 is advantageously made of soft cellular rubber, while the L-section portion of the member 6 is preferably made of stiffer rubber, but the two portions may be extruded simultaneously. As shown in FIG. 3, the bent-over shorter limb 20 of the member 6 is sized so as to fit into the slot 12 of the member 5 and to lock under the downturned longitudinally extending lip 14 on the member 5.

The downwardly extending leg of the member 6 is advantageously formed with a rib 24 to match the rib 15 on the member 5.

In use, the composite sealing strip 4 is fitted over a flange around a door or window opening so that the flange extends into the inverted U-shaped opening provided between the members 5 and 6. The ribs 15 and 24 engage the sides of the flange and help to prevent inadvertent removal of the sealing strip from the flange. The metal carriers 8 and 16 stiffen the sealing strip.

The tubular member 18 provides a draught and weather seal against which the vehicle door may close. If not required, the tubular member 18 may be dispensed with.

Figure 4:
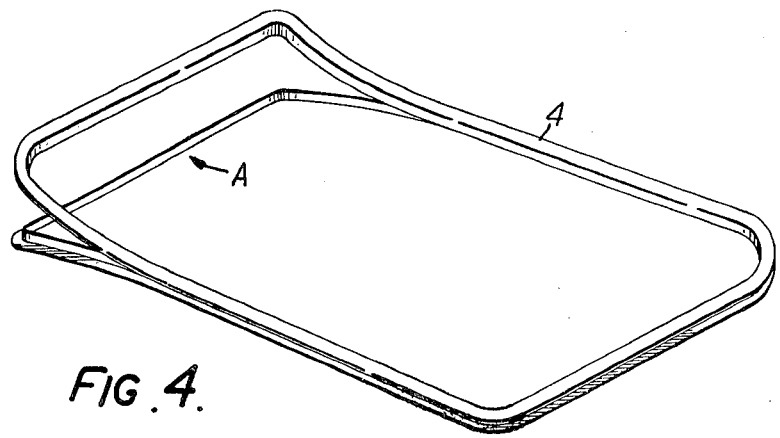
FIG. 4 is a perspective view of a length of the sealing strip of FIGS. 1 to 3 formed into a closed loop frame ready for fitting into a vehicle door or window opening.

It will be apparent that the sealing strip shown in FIG. 1 is advantageous over sealing strips which comprise extruded plastics material of U-section and incorporating a metal carrier of similar section, and onto one longitudinally extending side of which is stuck or otherwise fastened a rubber strip carrying a rubber tubular member similar to the tubular member 18. The sealing strip 4 shown in FIGS. 1 to 3 achieves the same effect as such other types of sealing strip but incorporates substantially less plastics material since the plastics material is of L-section instead of U-section.

Where the sealing strip of FIGS. 1 to 3 is to be positioned over a flange extending around a door or window opening, it may be pre-formed into a closed loop frame of the appropriate size and shape as shown in FIG. 4, and in this form its two portions 5 and 6 will be found to hold together satisfactorily both before and after they are fitted into the opening.

The fact that the frame is made of a sealing strip formed by two interlocking L-section members assists the assembly of the frame into the door opening. This is because the two L-cross-section members of the frame may be separated along one side of the frame as shown diagrammatically at A in FIG. 4. The frame can then easily be fitted by placing it, with appropriate orientation, inside the opening with the two split-apart members at A forming a "mouth" embracing the corresponding flanged edge of the opening. The frame is then moved so that the flange between the separated sections 5 and 6 of the frame moves even further into the mouth, thus enabling the remainder of the frame to engage the flange, and the frame is then moved in the reverse direction to complete this process, the two separated frame members 5 and 6 then being snapped together.

Although FIGS. 1 to 3 show one gripping rib, 15, 24, on each limb of the channel, there may be more than one rib on one or both of the limbs of the channel, with, if desired, unequal numbers of ribs on the two sides. As stated earlier, the material of the two members 5, 6 may be of different hardnesses. This means that the rib (or ribs) 15, 24 on each side of the channel may be of different hardnesses and this can improve the sealing and gripping properties of the ribs when the sealing strip is mounted on a mounting flange. The harder of the ribs locates the strip on the mounting flange while the softer of the ribs (on the opposite side of the flange) provides improved sealing and gripping properties.

What is claimed is:

1. A sealing strip, comprising
reinforcing metal carrier means defining a generally channel shape having a base and side walls,
flexible covering material enclosing the base and the side walls of the channel, and
respective gripping ribs defined by and integral with the said flexible covering material and positioned on the inner, facing, surfaces of the said side walls of the channel, the ribs extending along the said surfaces longitudinally of the channel and being directed towards each other,
the ribs on the respective surfaces being of different hardnesses.

2. A strip according to claim 1, including a soft sealing section extending longitudinally of the channel and carried on the outer surface of one of the said walls.

3. A sealing strip, comprising
first and second longitudinally extending flexible members each of generally L-form in cross-section,
locating means carried on the members and locating them together with the short legs of each "L" overlapping, so as together to define a longitudinally extending channel,
each member comprising flexible plastics or rubber material with a metal carrier embedded in at least one of the members,
one of said members having on its outside surface and integral with the said material thereof a soft sealing section running longitudinally of the member.

4. A strip according to claim 3, in which at least one said member comprises extruded plastics material.

5. A strip according to claim 3, in which at least one said member comprises extruded rubber material.

6. A strip according to claim 3, in which the metal carrier is made of individual elements spaced apart along the length of the member.

7. A strip according to claim 3, in which one of the said members carries a compressible seal member extending longitudinally along an external surface thereof.

8. A strip according to claim 7, in which the first member is made from plastics material and the second member is made from rubber material and the longer limb of the L of the second member has, integral with the rubber material on its external side, and extending therealong in the direction of the strip, the said sealing section.

9. A strip according to claim 7, in which the first member carries a lip extending longitudinally along the member on the inside of the longer limb of the L-section and spaced a short distance from the corner of the L, so as to define, with the shorter limb of the L, a longitudinally extending slot which receives the distal edge of the shorter limb of the L-section of the second member.

10. A strip according to claim 3, in which the distal edge of the shorter limb of the first member is bent over towards the inside of the L to form a lip which engages the outside of the corner of the L of the second member.

11. A closed-loop sealing frame made of a sealing strip according to claim 3 and for fitting into a door or window opening in a vehicle to cover the flange therearound, the channel facing outwardly of the frame.

12. A method of fitting a closed loop sealing frame into a door or window opening in a vehicle to cover a flange therearound, the frame being made of a sealing strip comprising two longitudinally extending members each of L-shape in cross-section and each made of an L-shaped cross-section reinforcing metal carrier covered with flexible covering material, the two said members extending longitudinally alongside each other and being separate from each other but attached to each other so that in their attached form they together define a channel facing outwardly of the frame, the said method including the steps of
separating the two members along one side of the frame so as to provide a mouth into which one edge of the said door or window opening may be inserted,
inserting the said one edge of the said door or window opening into the said mouth and moving the frame relative to the said one edge of the door or window opening so as to facilitate fitment of the frame into the said opening,
relatively moving the frame and the door or window opening in the opposite direction so as to tend to move the said one edge of the door or window opening out of the said mouth and to complete the fitment of the frame on to the other edges of the said opening, and
then snapping the two separated members together onto the said one edge of the door or window opening.

13. A strip according to claim 7, in which a said reinforcing metal carrier is embedded in each of the said members, and each metal carrier is of L-form in cross-section.

14. A channel-shaped sealing strip, comprising first and second longitudinally extending members each of generally L-form in cross-section and each comprising a longitudinally extending reinforcing metal carrier of L-form in cross-section and flexible covering material completely covering each metal carrier, the two said members being mutually positioned with the short legs of each L overlapping so as together to define a longitudinally extending channel, the flexible covering material of the said first member defining a lip extending longitudinally along the member on the inside of the longer limb of the L thereof and spaced a short distance from the corner of the L, so as to define, with the shorter limb of the L, a longitudinally extending slot in which is received the distal edge of the shorter limb of the L of the said second member, and the flexible covering material of the said first member being bent over towards the inside of the L along the distal edge of its shorter limb so as to form a second lip which engages the outside of the corner of the L of the second member, the two said lips serving to locate the two said members together when they are mounted on a mounting flange inserted through the mouth of the channel, the flexible covering material on each said member defining a respective gripping rib which runs longitudinally along the inside wall of the channel defined by that member.

* * * * *